Figure 1:
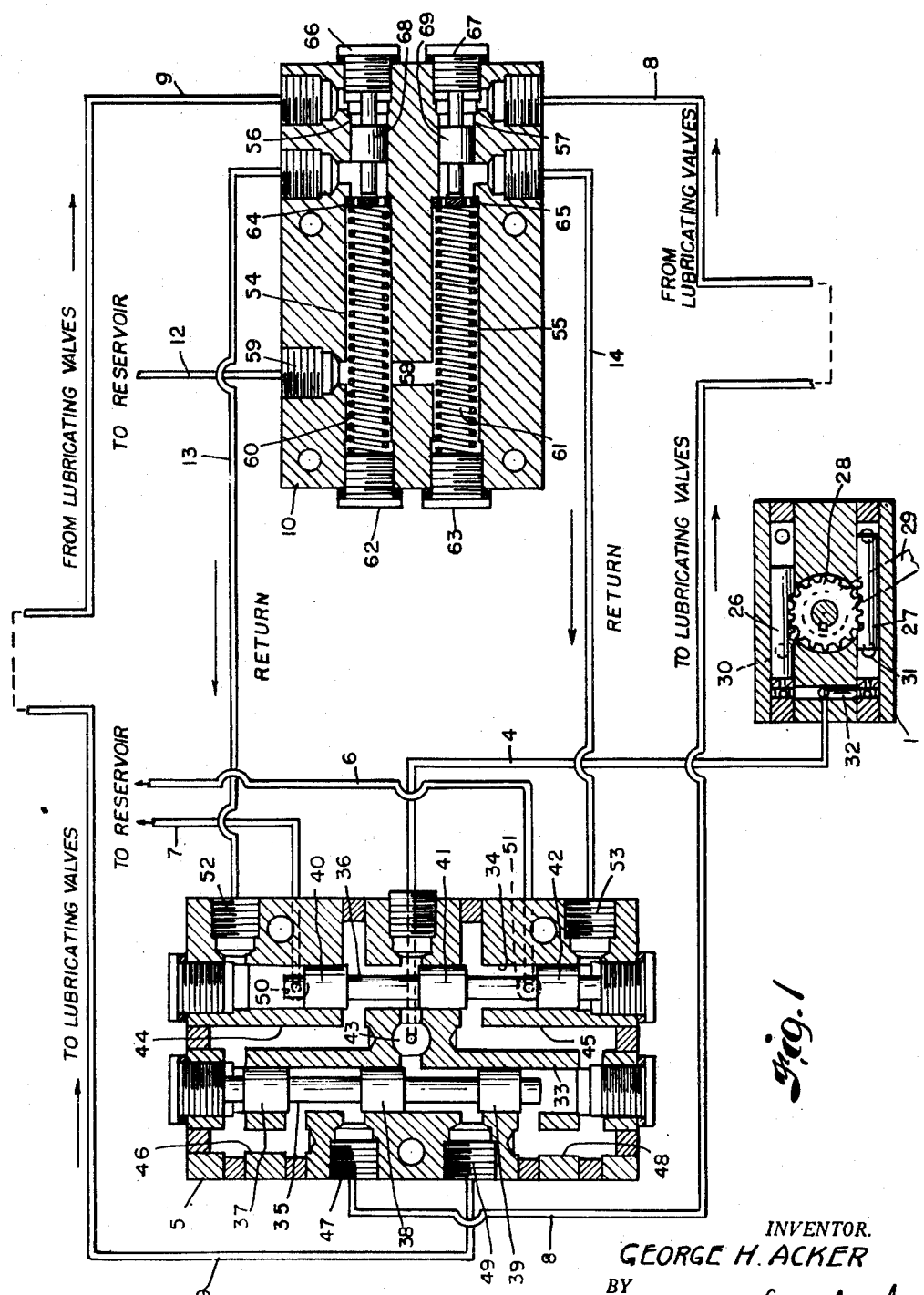

May 24, 1955  G. H. ACKER  2,708,984
LUBRICATING SYSTEM AND REVERSING VALVE THEREFOR
Filed June 30, 1951  3 Sheets-Sheet 1

INVENTOR.
GEORGE H. ACKER
BY
Oberlin & Limbach
ATTORNEYS.

INVENTOR.
GEORGE H. ACKER
BY
Oberlin & Limbach
ATTORNEYS.

United States Patent Office 2,708,984
Patented May 24, 1955

2,708,984

LUBRICATING SYSTEM AND REVERSING VALVE THEREFOR

George H. Acker, Shaker Heights, Ohio, assignor to The Farval Corporation, Cleveland, Ohio, a corporation of Ohio Application June 30, 1951, Serial No. 234,636

9 Claims. (Cl. 184—7)

This invention relates as indicated to a hydraulic reversing valve, and more particularly to a pressure lubricating system including such valve whereby predetermined measured charges of a lubricant may be dispensed at spaced points, as to bearings and the like, at predetermined intervals.

Various types of lubricating systems are now in use for supplying lubricants such as grease or oil to the bearings of many types of machinery such as mill stands, tables and coilers of hot strip mills, shears and punches and the like. An example of a special measuring valve adapted to be employed in such systems to dispense predetermined amounts of lubricant to a bearing is disclosed in Patent No. 2,061,372 to Aaron J. Jennings. In a system employing valves of this type, two parallel lubricant supply lines are provided together with a pump designed alternately to supply lubricant under pressure to each of such lines. The lubricant measuring or dispensing valves of the type above referred to will force a desired amount of lubricant into the bearing each time one of such lines is put under pressure.

In my co-pending application Serial No. 687,474 entitled "Lubricating Mechanism," filed July 31, 1946, now Patent No. 2,600,178, I disclose a novel pump and control means associated therewith whereby lubricant or other fluid may be thus alternately directed under pressure to such supply lines at selected time intervals. The mechanism disclosed and claimed in such co-pending application is furthermore so designed that the pump may operate continuously even when no fluid is permitted to enter one of such supply lines.

The valve means employed in hydraulic systems of this type and particularly lubricant dispensing systems for the purpose of thus alternately directing the fluid received under pressure from the pump to the respective supply lines has tended in the past to be rather expensive of construction if trouble-free operation is to be ensured. Inasmuch as the most important feature of lubricating systems of this type is their reliable automatic operation, the various moving parts require to be carefully machined, finished and fitted. It is accordingly a primary object of my invention to provide a flow reversing valve of simplified construction whereby the cost of obtaining satisfactory fits may be minimized.

Another object is to provide a novel flow reversing valve which will be exceptionally efficient and trouble-free in operation.

A further object is to provide a fluid and more particularly lubricant dispensing system of the well-known "Dualine" type utilizing such novel flow reversing valve in combination with novel pressure control means, together with the usual measuring valves whereby measured charges of lubricant may be dispensed at timed intervals to bearings and the like.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 2:
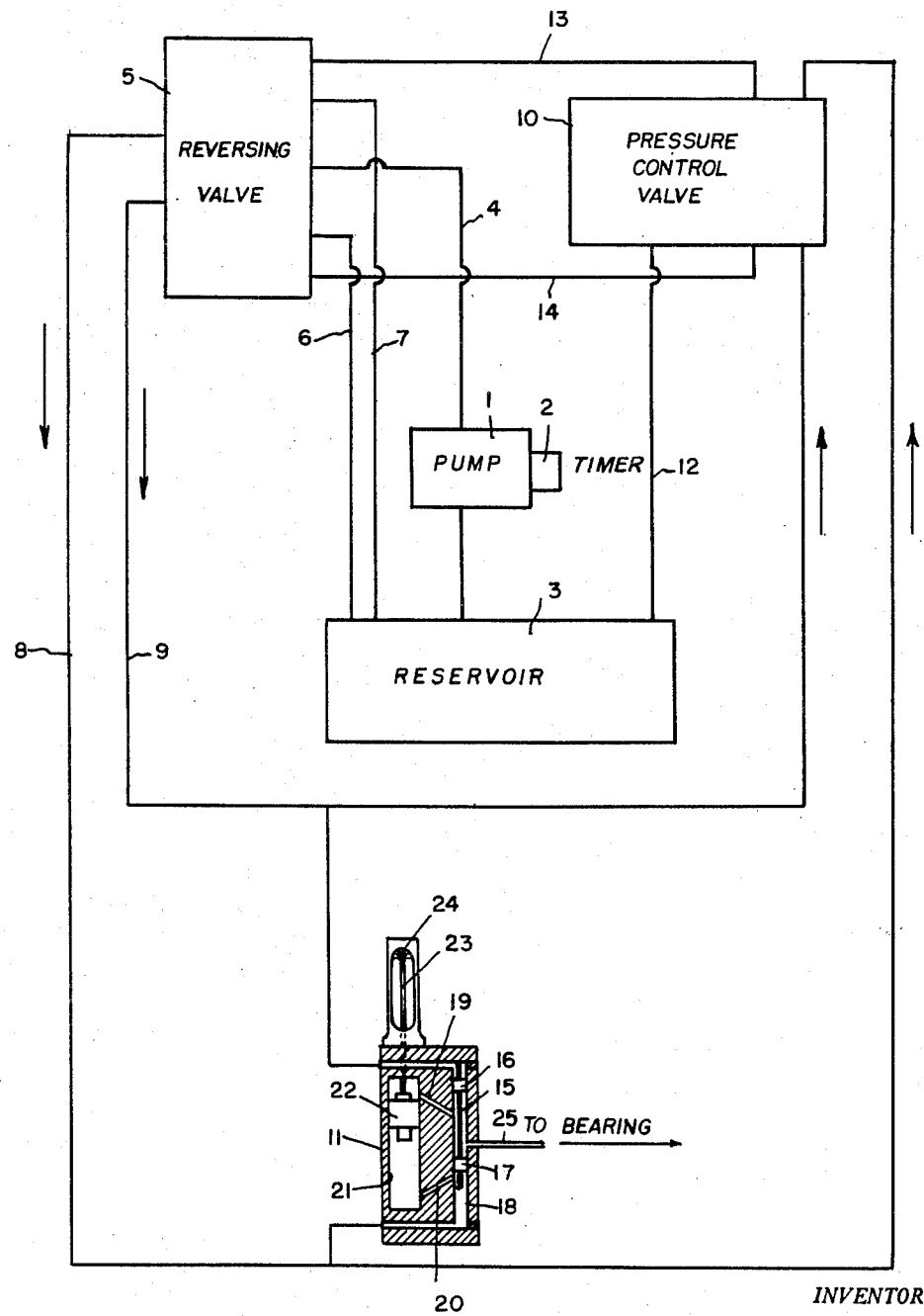
Figure 3:
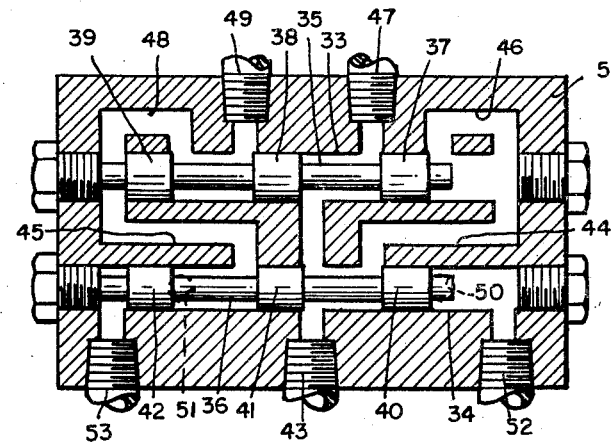
Figure 4:
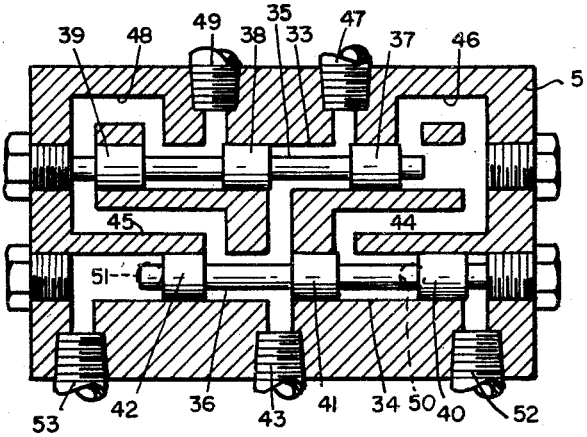
Figure 5:
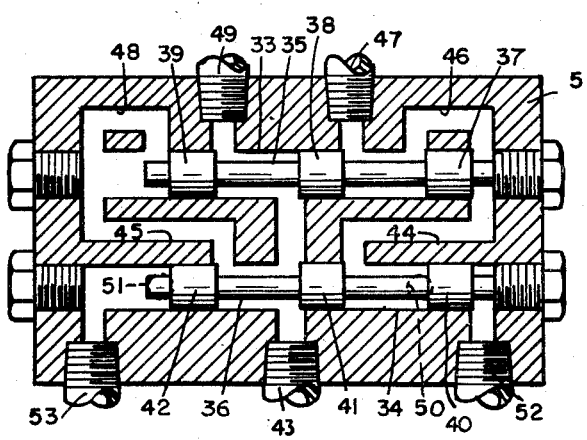

In said annexed drawing:

Fig. 1 constitutes a showing in section of my novel flow reversing valve and pressure control unit together with a semi-diagrammatic illustration of the manner in which such devices may be interconnected in a lubricant dispensing system or the like;

Fig. 2 is a diagram of such a fluid pressure system illustrating the manner in which a typical measuring valve may be connected across the two supply lines; and Figs. 3, 4 and 5 are semi-diagrammatic illustrations in section of my new flow reversing valve illustrating different positions of the valve members during operation of the same.

Now referring more particularly to said drawing and especially Figs. 1 and 2 thereof, the embodiment of my invention there illustrated may comprise a pump 1 adapted to be driven in any conventional manner at timed intervals under the control of timer 2 to deliver lubricant from reservoir 3 through line 4 to flow reversing valve 5. Such valve is connected to reservoir 3 through lines 6 and 7 and also to pressure supply lines 8 and 9 which lead to pressure control valve 10. One or more measuring or dispensing valves 11 are connected across lines 8 and 9 to deliver a predetermined charge of lubricant to a bearing or the like when lines 8 and 9 are respectively placed under pressure. Line 12 leads from pressure control valve 10 to reservoir 3 and return lines 13 and 14 lead from valve 10 to flow reversing valve 5.

The pump 1, timer 2, and reservoir 3 may be of any well-known type and a reservoir such as that disclosed in my aforesaid co-pending application Serial No. 687,474 may be utilized.

The well-known form of lubricant measuring or dispensing valve 11 shown in Fig. 2 comprises a valve member 15 having two shoulders 16 and 17 reciprocable in bore 18, the ends of which are in communication respectively with the two pressure supply lines 8 and 9. Passages 19 and 20 lead from bore 18 to the respective ends of measuring cylinder 21 in which piston 22 is adapted to reciprocate. A stem 23 extends from such latter piston and is adapted to engage an adjustable stop 24 whereby the stroke of such piston may be regulated. When line 8 is placed under pressure, lubricant will be forced into the lower end of bore 18 (as shown in Fig. 2) shifting valve member 15 to the position shown so that such lubricant enters cylinder 21 through passage 20 and acts upon piston 22 to force the latter upwardly, expelling lubricant from cylinder 21 through passage 19 and bore 18 to duct 25 leading to the bearing or like part to be lubricated. Conversely, when line 9 is placed under pressure and line 8 connected to relief, valve member 15 will be shifted downwardly so that lubricant under pressure will enter cylinder 21 through passage 19 to force piston 22 downwardly and expel the contents of the cylinder through passage 20 and bore 18 to duct 25. As above indicated, such operation of lubricant dispensing means is well known in the art and not itself a part of the present invention.

While the precise form of pump employed is likewise not a part of the present invention, the pump 1 may be of the type shown in Fig. 1 wherein two pistons 26 and 27 are adapted to be reciprocated by oscillation of pinion 28 through lever 29. The cylinders containing pistons 26 and 27 respectively communicate with reservoir 3 through inlet ports 30 and 31, forming inlet valves as such pistons are reciprocated. As either piston closes its inlet valve on the compression stroke, it causes shuttle piston 32 operating in a cross-bore to be displaced toward the other cylinder, thereby connecting the cylinder under pressure with discharge line 4. The fluid in reservoir 3 may be fed by gravity to inlet ports 30 and 31 or otherwise supplied under low pressure thereto depending upon the viscosity, etc., of the same.

Reversing valve 5 comprises a block which has been drilled to provide two parallel cylinders 33 and 34 in which two like valve members 35 and 36 respectively are adapted to reciprocate. Valve member 35 is provided with three shoulders 37, 38 and 39, and valve member 36 similarly with three shoulders 40, 41 and 42. Inlet line 4 from pump 1 enters the block centrally at 43 where it communicates directly with such two cylinders or bores 33 and 34. Passage 44 leads from one end of cylinder 33 to cylinder 34 at a point near the connection of the latter with inlet 43, and passage 45 similarly leads from the other end of cylinder 33 to cylinder 34 at a point equidistant to such inlet but to the other side thereof. A passage 46 leads from one end of cylinder 33 back to such cylinder at a point spaced from outlet port 47 a distance less than the distance between shoulders 37 and 38. Passage 48 leads from the other end of cylinder 33 back to such cylinder at a point spaced from outlet 49 a distance less than the distance between shoulders 38 and 39 of valve member 35.

Cylinder 34 communicates with relief line 7 through outlet port 50 spaced from the end of such cylinder a distance less than shoulder 40 when valve member 36 is in the Fig. 1 position and just beyond shoulder 40 when the valve member 36 has been fully reciprocated in the opposite direction. Similarly, relief line 6 communicates with cylinder 34 through outlet port 51 spaced in the same manner relative to the other end of such cylinder and shoulder 42 of valve member 36.

Return line 13 from pressure control valve 10 communicates with one end of cylinder 34 through inlet 52, and return line 14 from pressure control valve 10 communicates with the other end of cylinder 34 through inlet 53.

Pressure control valve 10 in reality comprises an assembly of two valves conveniently arranged as a single unit. Two parallel cylinders 54 and 55 are drilled in a single block communicating at one end with respective cylinders 56 and 57 of slightly smaller diameter. Cylinders 54 and 55 are joined by a transverse passage 58 communicating with relief port 59 connected to line 12. Powerful compression springs 60 and 61 are inserted within cylinders 54 and 55 respectively bearing against closure plugs 62 and 63 at one end and against perforated discs 64 and 65 at the other. Cylinders 56 and 57 are sealed with closures 66 and 67 respectively.

Valve members 68 and 69 are fitted for reciprocation within cylinders 56 and 57 respectively and are provided with stems adapted to engage closures 66 and 67 at one end and discs 64 and 65 at the other. Pressure lines 9 and 8 communicate with the ends of cylinders 56 and 57 respectively adjacent such latter closures, and return lines 13 and 14 lead from such cylinders respectively on the other side of valve members 68 and 69.

The operation of my new reversing valve may be best understood by now referring to diagrammatic Figs. 3, 4 and 5. As shown in Fig. 3, lubricant received under pressure from pump 1 at inlet port 43 is directed to outlet port 47 leading to pressure line 8, and at the same time pressure is directed through passage 44 to the right-hand end of valve piston 35, thereby holding such piston to the left as illustrated. Outlet port 49 leading to line 9 is connected through the bore of cylinder 33, passage 48, passage 45 and the bore of cylinder 34 to outlet port 51 communicating with relief line 6 leading to reservoir. Consequently, the lubricant measuring and dispensing valve 11 will be operated through the pressure differential between supply lines 8 and 9. Supply line 8 (leading from outlet port 47) returns to pressure control valve 10 where, however, it is dead-ended (Fig. 1) until sufficient pressure is built up in this line to overcome the resistance of pressure-controlled spring 61 which may be on the order of 1,000 pounds per square inch, for example.

When all of the valves such as 11 in the system have been operated, the lubricant fed into supply line 8 now has no other place to go so that the pressure in such supply line will thereupon be raised to a point where the resistance of pressure control spring 61 will be overcome and piston 69 shifted to the left as viewed in Fig. 1. When such piston is thus shifted, it first acts to cut off communication of return line 14 with passage 58 and relief line 12 and then subsequently uncovers the opening of line 14 into cylinder 57 to place line 14 in communication with line 8 so that lubricant from line 8 will flow through line 14 to inlet port 53 of flow reversing valve 5, entering the end of cylinder 34 behind shoulder 42 of valve member 36. Pressure control valve member 69 functions as a throttling valve and the pressure in such end of cylinder 34 is accordingly less than the pump pressure entering at 43. However, no great amount of pressure is required to shift the pilot piston 36 in its bore since the right-hand end of this bore (as viewed in Fig. 3) is connected to the reservoir both through outlet port 50 and also outlet port 52 leading to line 13 which communicates through pressure control valve body 10 with line 12. Accordingly, sufficient pressure will now be built up in line 14 to shift pilot piston 36 to the right as shown in Fig. 4.

In the phase shown in Fig. 4, it will be noted that the delivery of the pump is now directed to both of the outlet ports 47 and 49 leading to supply lines 8 and 9 respectively, but it will also be noted that the pump pressure is effective to act on the left-hand end of valve piston 35 (shoulder 39) whereas the other end of such piston is in communication with relief port 50. Since neither of the two lubricant supply lines 8 and 9 is relieved, the pump pressure serves to force piston 35 to the right into the position illustrated in Fig. 5.

The Fig. 5 phase is obviously the opposite to that of Fig. 3, and the pump pressure from inlet 43 will be directed to outlet 49 and supply line 9 again to operate measuring valve 11 to dispense a charge of lubricant to a bearing or the like. After all such measuring valves 11 have been operated, pressure will build up in supply line 9 sufficient to lift valve member 68 (Fig. 1) and thereby start another cycle of operation in the reversing valve 5.

It will be noted that a lubricating system embodying such reversing valve and pressure control valve will continue to function in the manner indicated as long as the pump is operating. Of course, the timer 2 may be set to cause such pump to operate only at certain predetermined intervals. In order to control such intermittent periods of pump operation, if the pump is electrically driven, a small stem can be extended from piston 35 through a suitable packing gland in one of the closure plugs adapted to operate a limit switch which in conjunction with an electrically driven time clock 2 would provide an intermittently operating automatic system wherein the pump would be stopped after all of the measuring valves 11 have been operated and the reversing valve shifted to its new position.

Of course, the position of stems 23 of the measuring valves 11 serves to indicate when all such valves have been operated so that pump 1 may be manually operated at intervals, as desired, to provide proper lubrication for the bearings or other parts.

Mechanism of the type shown and described may be adapted to a variety of purposes. For example, it may be mounted on a mine shuttle car regularly provided with hydraulic power circuits for actuating certain mechanisms thereon. The intermittent application of such hydraulic power to operate such other mechanisms may be utilized to reciprocate a spring-returned pump piston to supply lubricant to a system of the "Dualine" type including a reversing valve as shown and described herein to service the various bearings of the car. In general, my new valve and lubricating system incorporating the same may be utilized wherever lubricating systems of this general type have been found advantageous.

The novel valve means of this invention is relatively simple and inexpensive of construtcion, only three shoulders being necessary on each of the two pistons 35 and 36. The bores in which these pistons operate are accordingly considerably shorter than when a greater number of shoulders are necessary, and the cost of obtaining satisfactory fits is very materially reduced owing largely to the more favorable ratio of bore length to bore diameter. The size and weight of the mechanism has also been reduced as compared to other commercially available mechanisms serving a generally similar purpose.

Other modes of applying the principle of the invention may be employed, change being made as regards the details described, provided the features stated in any of the following claims or the equivalent of such be employed.

I therefore particularly point out and distinctly claim as my invention:

1. A valve especially suited for use in a pressure lubricating system including two lubricant supply lines, lubricant measuring and dispensing valves connected across such lines and adapted to be actuated when such lines are alternately placed under pressure, and a source of lubricant under pressure; said valve comprising means adapted to control flow of such lubricant from such source to such respective lines comprising a reversing valve having a first bore and valve piston therein and a second bore and valve piston therein, each said piston being provided with three shoulders, a fluid pressure inlet adapted to be connected with such source communicating with both said bores midway of their length, a passage leading from said first bore at a point adjacent but slightly spaced from the connection with said fluid inlet to a respective end of said second bore, a like passage similarly leading from said first bore at a point slightly spaced to the other side of the connection with said fluid inlet to the other end of said second bore, outlet ports leading from said second bore and communicating therewith in the regions between the central shoulder and end shoulders respectively of its valve piston, said outlet ports being adapted to lead respectively to such two lubricant supply lines, passages leading from the respective ends of said second bore back to said second bore at points spaced from the adjacent outlet port a distance less than the distance between such central shoulder and such respective end shoulders of its valve piston, the length of said second bore relative to the length of its piston being effective to limit reciprocation of such piston to maintain said outlet ports always in communication with said second bore intermediate such central shoulder and such respective end shoulders, and outlets to relief from said first bore communicating therewith at points spaced from the respective ends thereof a distance greater than the length of the respective end shoulders of its valve piston to communicate alternately with the respective ends of said bore and with the said respective passages leading from said first bore to the respective ends of said second bore; and pressure control means connected with said flow control means and adapted to be connected with such two lubricant supply lines, comprising two bores in communication with relief, a compression spring in each said latter bore, an extension of each said latter bore, a valve piston in each said extension normally urged toward the end of said extension by said respective spring, such two lubricant supply lines respectively being adapted to communicate with such ends of said extensions whereby pressure in such lines will tend to shift said respective valve pistons in said extensions against the force of said springs, and return lines leading from said extensions at the other side of said valve pistons normally positioned therein to the respective ends of said first bore, said return lines thus being normally in communication with relief through said spring containing bores, and alternate pressure in such lubricant supply lines, when sufficient to overbalance said springs, thus being effective to shift said latter valve pistons to seal said respective return lines from relief and place them in communication with such lubricant supply lines.

2. A valve especially suited for use in a pressure lubricanting system including two lubricant supply lines, lubricant measuring and dispensing valves connected across such lines and adapted to be actuated when such lines are alternately placed under pressure, and a source of lubricant under pressure; said valve comprising means adapted to control flow of such lubricant from such source to such respective lines comprising a reversing valve having a first bore and valve piston therein and a second bore and valve piston therein, each said piston being provided with three shoulders, a fluid pressure inlet adapted to be connected with such source communicating with both said bores midway of their length, a passage leading from said first bore at a point adjacent but slightly spaced from the connection with said fluid inlet to a respective end of said second bore, a like passage similarly leading from said first bore at a point slightly spaced to the other side of the connection with said fluid inlet to the other end of said second bore, outlet ports leading from said second bore and communicating therewith in the regions between the central shoulder and end shoulders respectively of its valve piston, said outlet ports being adapted to lead respectively to such two lubricant supply lines, passages leading from the respective ends of said second bore back to said second bore at points spaced from the adjacent outlet port a distance less than the distance between such central shoulder and such respective end shoulders of its valve piston, the length of said second bore relative to the length of its piston being effective to limit reciprocation of such piston to maintain said outlet ports always in communication with said second bore intermediate such central shoulder and such respective end shoulders, and outlets to relief from said first bore communicating therewith at points spaced from the respective ends thereof a distance greater than the length of the respective end shoulders of its valve piston to communicate alternately with the respective ends of said bore and with the said respective passages leading from said first bore to the respective ends of said second bore; and pressure control means connected with the respective ends of said first bore and adapted to be connected with such respective lubricant supply lines adapted normally to connect such bore ends to relief but operative, under action of sufficient pressure in such lines, to close such latter connection to relief and connect a respective end of said bore with such corresponding supply line under pressure.

3. A valve especially suited for use in a pressure lubricating system including two lubricant supply lines, lubricant measuring and dispensing valves connected across such lines and adapted to be actuated when such lines are alternately placed under pressure, and a source of lubricant under pressure; said valve comprising means adapted to control flow of such lubricant from such source to such respective lines comprising a reversing valve having a first bore and valve piston therein and a second bore and valve piston therein, each said piston being provided with three shoulders only, a fluid pressure inlet adapted to be connected with such source communicating with both said bores midway of their length and thereby adapted to communicate alternately with the respective regions between the central and end shoulders of said pistons depending on the position of the latter in said bores, passages communicating with such respective regions in said first bore in all positions of said piston therein and leading to the respective ends of said second bore, passages leading from the respective ends of said second bore back to said second bore at points alternately communicating with such respective regions therein and with the same end portions depending on the position of said piston therein, outlet ports being adapted to lead from said second bore to such respective lubricant supply lines and respectively communicating with such regions of said second bore in all positions of said piston therein, and outlets to relief from said first bore alternately communicating with the respective ends thereof and such respective regions intermediate said shoulders of said piston therein depending upon the position of said piston; and pressure control means connected with the respective ends of said first bore and adapted to be connected with such respective lubricant supply lines adapted normally to connect such bore ends to relief but operative, under action of sufficient pressure in such lines, to close such latter connection to relief and connect a respective end of said bore with such corresponding supply line under pressure.

4. A flow reversing valve comprising a block having a first bore and a second parallel bore therein, each said bore having closed ends, a valve piston in each said bore, each piston having three shoulders only, a fluid pressure inlet communicating with both said bores midway of their length and adapted to communicate alternately with the respective regions between the central and end shoulders of said pistons depending upon the position of the latter in said bores, two passages communicating with such respective regions of said first bore in all positions of said piston therein and each leading to and communicating with a different one of the respective opposite ends of said second bore, two passages each leading from one only of the respective opposite ends of said second bore back to said second bore at points adapted alternately to communicate with the adjacent regions defined between the central and end shoulders of said piston therein and with the same end portions of said second bore depending on the position of said piston therein, two fluid pressure outlet ports leading from said second bore and adapted respectively to communicate with such respective inter-shoulder regions thereof in all positions of said piston therein, two outlets to relief from said first bore adapted alternately to communicate with the respective ends thereof and such respective regions intermediate said shoulders of said piston therein depending on the position of said piston, and fluid pressure inlet ports to the respective ends of said first bore.

5. A flow reversing valve comprising a first bore and a second bore having closed ends, a valve piston reciprocable in each said bore, each piston having three shoulders, a fluid pressure inlet communicating with both said bores midway of their length, two passages respectively communicating with said first bore at each side of said inlet and leading to the respective ends of said second bore, two fluid pressure outlets leading from said second bore spaced from the ends thereof, two passages leading from the respective ends of said second bore and returning to said second bore at points intermediate said respective ends and the adjacent outlet port, two outlets to relief from said first bore at points between the respective ends of said latter bore and said respective passages leading from said first bore to the ends of said second bore, and fluid pressure inlets leading to the respective ends of said first bore, the lengths of said pistons relative to their respective bores and the spacing of said shoulders being selected to place said first fluid pressure inlet in communication with one of said fluid pressure outlets when both said pistons are reciprocated in one direction and in communication with the other said fluid pressure outlet when both said pistons are reciprocated in the other direction, to place the fluid pressure outlet not thus in communication with said first inlet in communication with a said respective relief outlet through a said passage leading from said second bore adjacent said latter outlet to the adjacent end of said second bore and a said passage leading from such end of said second bore to said first bore, to place the other end of said second bore in communication with said first inlet to hold the piston therein against return reciprocation, and to place the corresponding end of said first bore in communication with said other respective relief outlet.

6. A flow reversing valve comprising a first bore and a second bore having closed ends, a valve piston reciprocable in each said bore, each said piston having three shoulders, a fluid pressure inlet communicating with both said bores adapted to communicate alternately with the respective regions between the central and other two shoulders of both said pistons depending on the position of the latter in their said bores, two passages adapted each to communicate with a different one of said respective regions of said first bore in all positions of said piston therein and leading to opposite ends of said second bore, two passages leading from such respective opposite ends of said second bore back to said second bore at points adapted alternately to communicate with said adjacent respective regions therein and with the same end portions depending on the position of said piston therein, two fluid pressure outlet ports leading from said second bore and adapted respectively to communicate with said respective regions between the central and other two shoulders of said piston therein in all positions of said piston therein, two outlets to relief from said first bore adapted alternately to communicate with the respective opposite end portions of said first bore and the adjacent said regions between said central and other two shoulders of said piston therein depending on the position of said piston, and fluid inlet ports to the respective ends of said first bore.

7. A valve especially suited for use in a lubricating system including two lubricant supply lines, at least one lubricant measuring and dispensing valve connected across such lines and adapted to dispense a measured charge of lubricant to a bearing or the like when actuated by pressure alternately in such lines, a lubricant reservoir, a pump operative to deliver lubricant from such reservoir to such lines under pressure, and timer means operative to control the intervals of such delivery; said valve comprising a flow reversing valve having a first bore and a second bore, a valve piston reciprocable in each said bore, each said piston having three shoulders, a fluid pressure inlet adapted to be connected with such pump and communicating with both said bores adapted to communicate alternately with the respective regions between the central and other two shoulders of both said pistons depending on the position of the latter in their said bores, two passages adapted respectively to communicate with said respective regions of said first bore in all positions of said piston therein and leading to the respective ends of said second bore, two passages leading from the respective ends of said second bore back to said second bore at points adapted alternately to communicate with said adjacent respective regions therein and with the same end portions depending on the position of said piston therein, two fluid pressure outlet ports leading from said second bore adapted to be connected with such respective lubricant supply lines and adapted respectively to communicate with said respective regions of said second bore in all positions of said piston therein, two outlets to reservoir from said first bore adapted alternately to communicate with the respective end portions of said first bore and the adjacent said regions between said central and other two shoulders of said piston therein depending on the position of said piston, and fluid inlet ports to the respective ends of said first bore; and pressure control means for each such lubricant supply line, each such control means comprising a valve adapted to connect such line to a said respective inlet port at an end of said first bore, means normally holding said latter valve closed but adapted to be overbalanced by predetermined pressure in such line to open such valve, and valve means normally connecting said latter inlet port to reservoir but adapted to close with the opening of said valve connecting such line to said port.

8. In a lubricating system or the like having two supply lines, measuring and dispensing valves connected across such lines and adapted to be actuated by placing such lines alternately under pressure to dispense a measured charge of such lubricant, and a source of lubricant under pressure; a flow reversing valve adapted to direct lubricant from such pressure source alternately to such two lines, said valve including a flow reversing valve member reciprocable thus to direct such flow from such pressure source, and a pilot valve member reciprocable to direct pressure from such source alternately to the respective ends of said flow reversing valve member thus to reciprocate the latter; a pressure regulating valve connected directly in each such line intermediate the last such dispensing valve and said pilot valves adapted to be overbalanced by a predetermined pressure in such line achieved after servicing of such dispensing valves to admit fluid pressure from such line to an end of said pilot valve member to reciprocate the latter, whereby flow of lubricant from such pressure source may be alternated automatically to first one such line and then the other after such dispensing valves have been serviced; and means operative with shifting of said pressure regulating valves to connect the line not receiving lubricant to relief.

9. In a lubricating system having two supply lines, dispensing valves connected across such lines and adapted to be actuated by placing such lines alternately under pressure to dispense a charge of such lubricant, and a source of lubricant under pressure; a flow control valve adapted to direct the flow of lubricant from such source alternately to such respective lines, and valve means responsive to predetermined pressure in the terminal portion of such line to which such flow is thus directed operative to admit fluid pressure to shift such control valve to direct such flow to the other such line and connect such line not receiving lubricant to relief, said valve means being operative to connect the line leading therefrom to such control valve to relief when shifted to closed position.

References Cited in the file of this patent
UNITED STATES PATENTS

| | | |
|---|---|---|
| 2,007,156 | Burrell | July 9, 1935 |
| 2,052,664 | Rotter | Sept. 1, 1936 |
| 2,287,709 | Ringman | June 23, 1942 |
| 2,446,611 | Rose | Aug. 10, 1948 |